(12) United States Patent
Horton (10) Patent No.: US 7,500,456 B2
(45) Date of Patent: Mar. 10, 2009

(54) CAM CONNECTING SHAFT AND METHOD OF USE

(76) Inventor: Jeffrey B. Horton, 1829 NW. 4th Dr., Oklahoma City, OK (US) 73106

( * ) Notice: Subject to any disclaimer, the term of this patent is extended or adjusted under 35 U.S.C. 154(b) by 55 days.

(21) Appl. No.: 11/323,652

(22) Filed: Dec. 30, 2005

(65) Prior Publication Data

US 2006/0157007 A1 Jul. 20, 2006

Related U.S. Application Data

(60) Provisional application No. 60/645,579, filed on Jan. 16, 2005.

(51) Int. Cl.
*F01L 1/04* (2006.01)

(52) U.S. Cl. ............... 123/90.6; 123/90.44; 123/90.27; 29/888.1; 464/88; 464/182; 403/337

(58) Field of Classification Search ............... 123/90.6, 123/90.16, 90.18, 90.44, 90.27, 90.31; 464/182, 464/88; 403/337, 336; 29/888.1
See application file for complete search history.

(56) References Cited

U.S. PATENT DOCUMENTS

| 2,585,113 | A | * | 2/1952 | Gredell | .................. 464/32 |
| 4,685,823 | A | * | 8/1987 | Lopez | .................. 403/359.2 |
| 4,722,717 | A | * | 2/1988 | Salzman et al. | ............. 464/182 |
| 6,171,195 | B1 | * | 1/2001 | Ferguson | .................. 464/137 |
| 6,364,779 | B1 | * | 4/2002 | Duddy | .................. 464/182 |
| 6,405,424 | B1 | * | 6/2002 | Ferguson | .................. 29/464 |
| 6,752,560 | B2 | * | 6/2004 | Wilson et al. | ............. 403/1 |

\* cited by examiner

*Primary Examiner*—Ching Chang
(74) *Attorney, Agent, or Firm*—Dunlap Codding, P.C.

(57) ABSTRACT

The present invention is a novel non-splined shaft for connecting cam units (cam sections) in a series to construct a camshaft having zero degree backlash for use within an engine. Such engines typically use a camshaft comprised of a plurality of separate camshaft units (cam sections) which are connected in a series by one or more cam connecting shafts. The entire series of camshaft units and cam connecting shafts may be, for example, 40 feet in length. Examples of natural gas engines in which the cam connecting shafts described herein may be used include, but are not limited to, the INGERSOLL-RAND KVR and KVT series of engines.

12 Claims, 10 Drawing Sheets

CAM CONNECTING SHAFT AND METHOD OF USE

CROSS-REFERENCE TO RELATED APPLICATIONS

This application claims the benefit under 35 U.S.C. 119(e) of U.S. Provisional Application Ser. No. 60/645,579, filed Jan. 16, 2005, the entirety of which is hereby expressly incorporated by reference herein.

STATEMENT REGARDING FEDERALLY SPONSORED RESEARCH OR DEVELOPMENT

Not applicable.

BACKGROUND OF THE INVENTION

The present invention is related to shafts for connecting separate camshaft sections or units into a single camshaft, and methods of their use in connecting camshaft sections or units together for use in an engine.

INGERSOLL-RAND engines of the KVR and KVT series currently use a camshaft which is constructed from separate cam sections which are connected together in a series by splined cam connecting shafts as shown and as designated herein as "prior art." Each cam connecting shaft has splined ends upon each of which is matingly fitted a specific splined coupler.

The splined coupler is attached to the splined cam connecting shaft by a pair of retaining plates which seat into a groove behind the splines of the splined shaft. The splined coupler is then connected to the coupler end on the of the cam section via a plurality of bolts thereby connecting the cam section to the cam connecting shaft. The splines of the splined coupler fit into the gaps between the splines of the splined cam connecting shaft with sufficient clearance such that there is "play" (movement) between the splined coupler and the splines of the splined cam connecting shaft. The splined coupler is therefore not absolutely rigidly connected to or integral to the splined end of the splined cam connecting shaft.

Due to the "play" present in the coupling between the cam sections, wear of the splines of the splined coupler and the splines of the cam connecting shaft occurs during long term operation of the engine. Eventually, the "play" within the camshaft can increase to a magnitude which decreases the efficiency of the engine and decreases the stability and strength of the camshaft as a whole. This wear often necessitates replacement of the splined cam connecting shafts, and/or the replacement of the splined couplers which are mounted upon and which mate with the splines of the splined cam connecting shaft. Additionally, the grooves for the two retaining plates near the ends of the cam connecting shaft may introduce weakness in the shaft.

While the splined coupler has certain disadvantages as noted above, it advantageously enables the splined cam connecting shaft to be engineered in a more or less single standard configuration. Splined couplers designed to fit to cam sections having different coupling configurations can be fitted to the one type of splined connecting shaft. For example, the INGERSOLL-RAND KVR and KVT series has cam sections having couplers designated as "A," "B," "C," and "D." Each designation represents a different angle between the splines and the alignment pin. The alignment of the cam section is matched with the alignment of the splined coupler by an alignment pin which fits into an alignment hole on the cam section. Thus, splined couplings having different alignment pin positions can be attached to the same standard splined cam connecting shaft. Using various combinations of these four different couplers any of the at least ten different angles necessary can be created.

SUMMARY OF THE INVENTION

The present invention is a novel non-splined shaft for connecting cam units (cam sections) in a series to construct a camshaft for use within an engine. Such engines typically use a camshaft comprised of a plurality of separate camshaft units (cam sections) which are connected in a series by one or more cam connecting shafts. The entire series of camshaft units and cam connecting shafts may be, for example, 40 feet in length. Examples of natural gas engines in which the cam connecting shafts described herein may be used include, but are not limited to, the INGERSOLL-RAND KVR and KVT series of engines.

More particularly, the present invention is an indexed non-splined spacer having integral or rigidly secured couplers for connecting two cam sections. More than one of these indexed non-splined spacers (cam connecting shafts) can be used to connect a plurality of cam sections into a series of cam sections thereby providing a single camshaft with zero degree backlash for use in the engine.

DETAILED DESCRIPTION OF THE INVENTION

The present invention comprises a non-splined cam connecting shaft (a non-splined indexed spacer) having integral couplers or rigidly secured couplers which are integral to or rigidly connected to the ends of a bar of the cam connecting shaft.

Before further discussion of the cam connecting shaft of the present invention, the prior art apparatus will be described in more detail.

Figure 1:
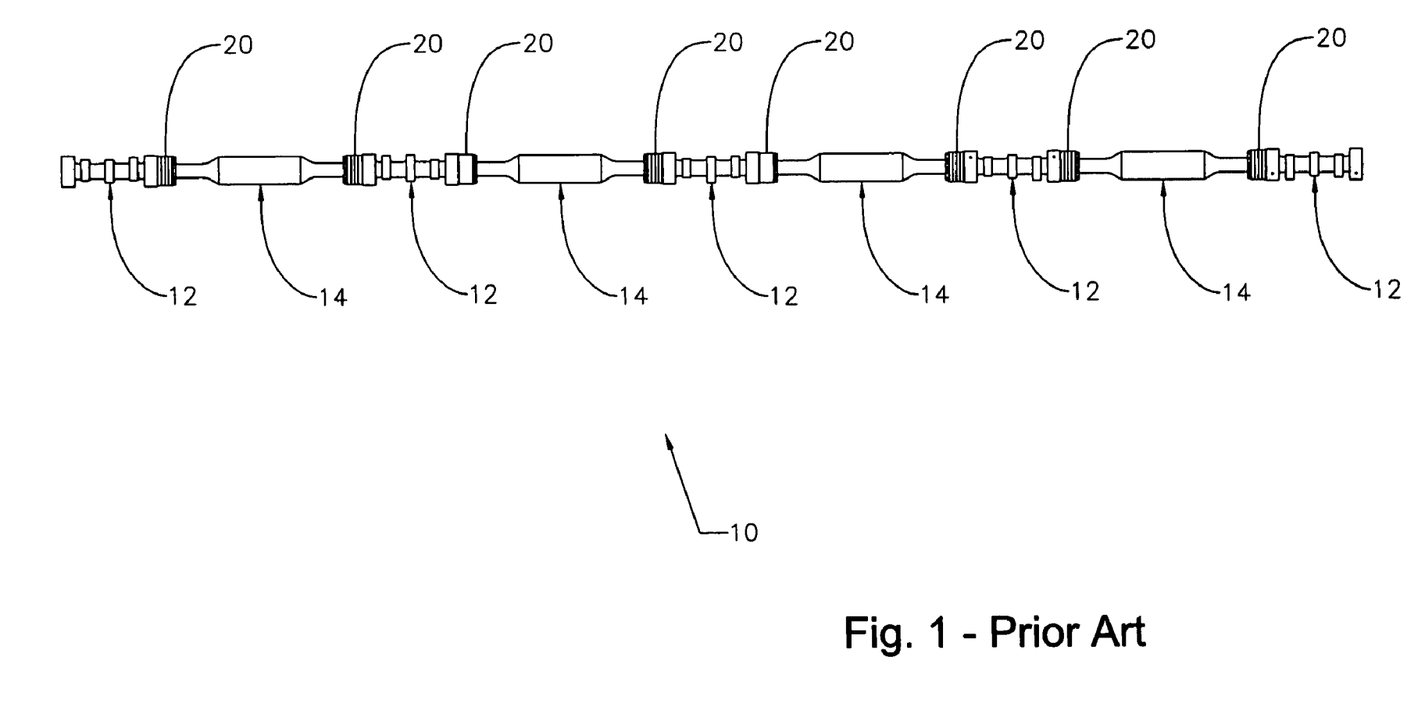
FIG. 1 shows an elevational view of a prior art camshaft such as is used in an INGERSOLL-RAND 410 KVT engine.
Figure 2:
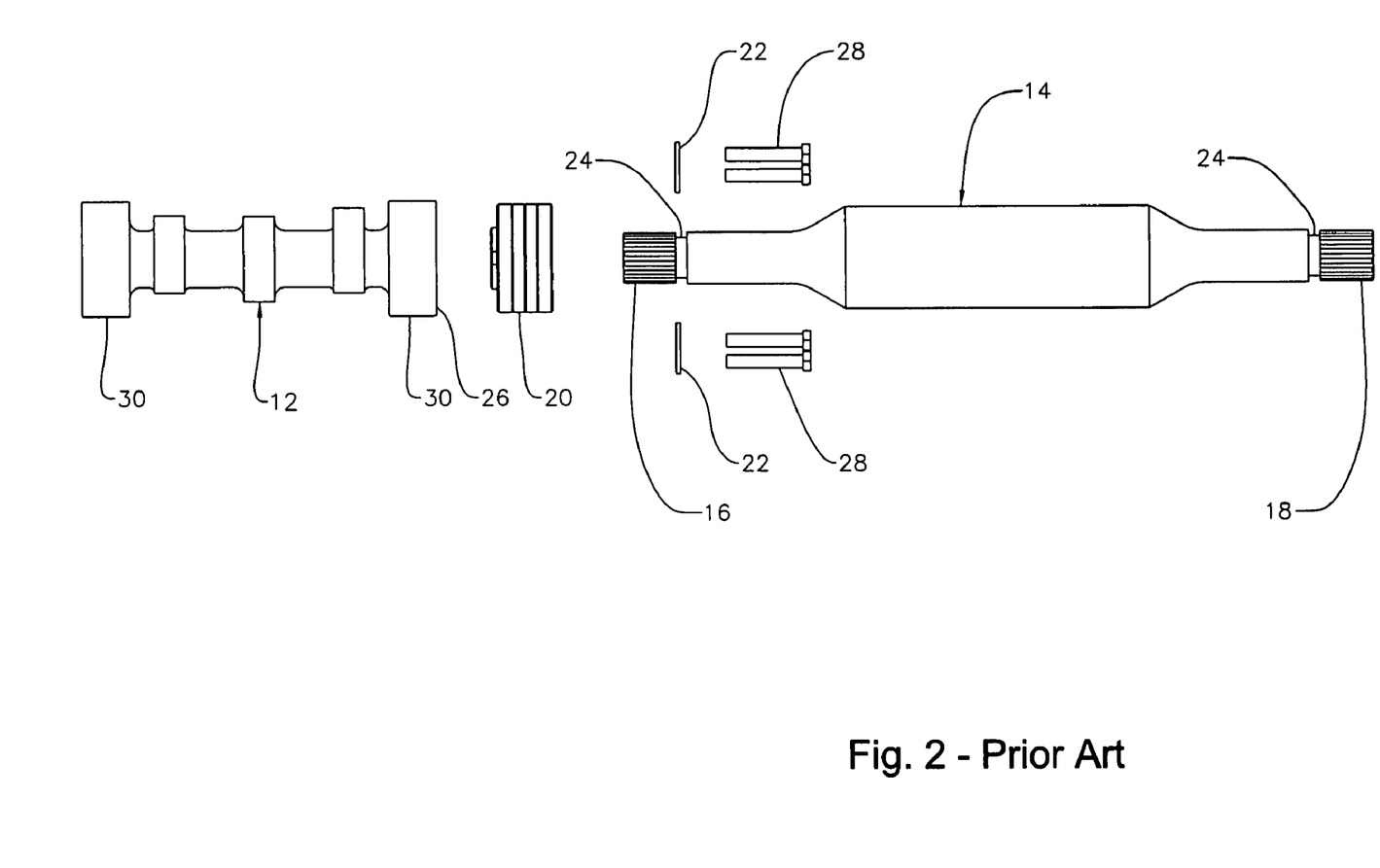
FIG. 2 shows an elevational view of a disassembled prior art camshaft including a cam section, splined cam connecting shaft, and splined coupler.
Figure 3:
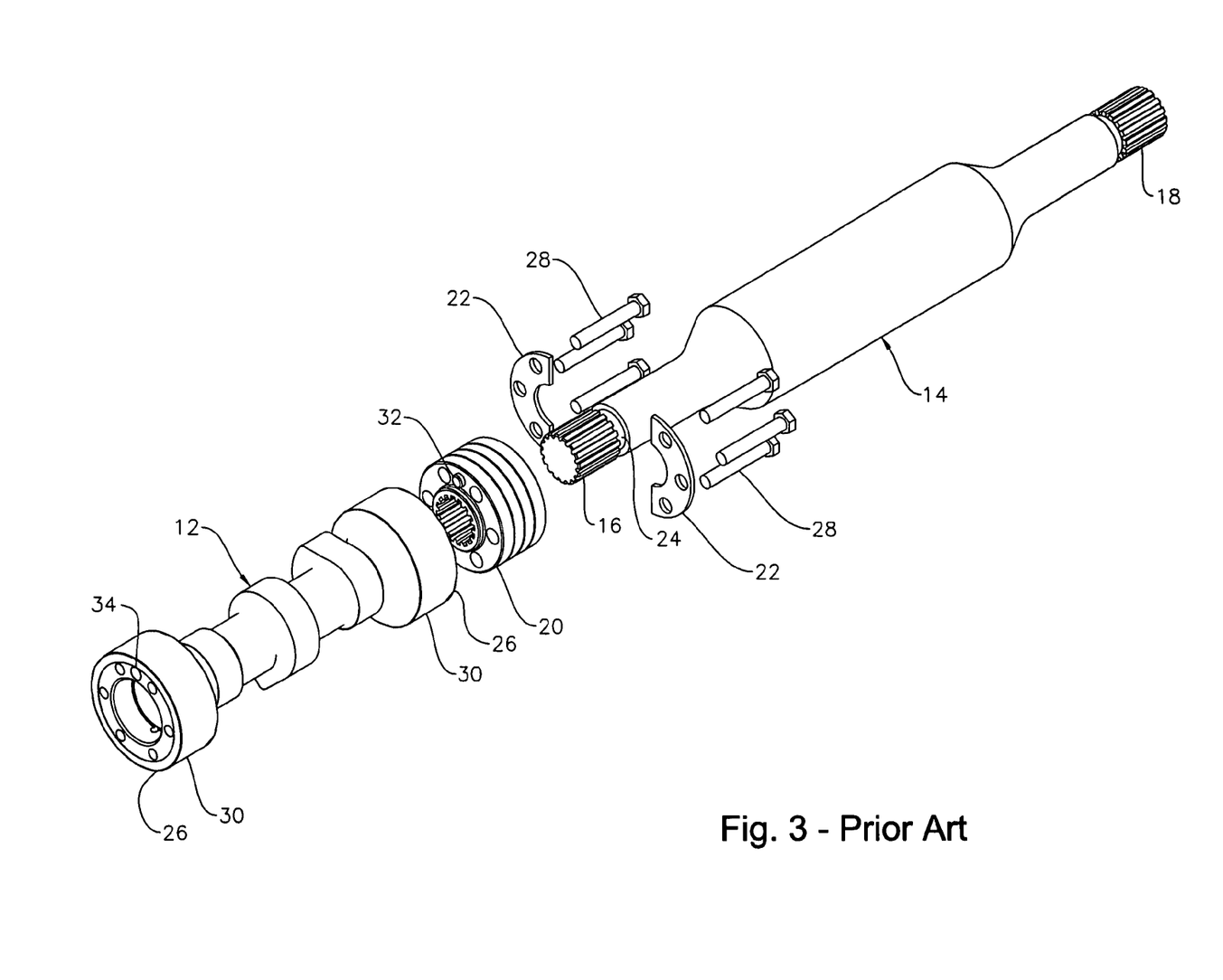
FIG. 3 shows a perspective view of the disassembled prior art cam section, splined cam connecting shaft and splined coupler of FIG. 2.

As mentioned previously, INGERSOLL-RAND engines of the KVR and KVT series currently use a prior art camshaft such as the camshaft referred to in FIGS. 1-3 by the general reference numeral 10. The camshaft 10 is constructed from a plurality of cam sections 12 which are connected in a series by splined cam connecting shafts 14. Each splined cam connecting shaft 14 has a first splined end 16 and a second splined end 18 (FIG. 2). A splined coupler 20 is matingly fitted on each of first splined end 16 and second splined end 18 of the splined cam connecting shaft 14.

The splined coupler 20 is then connected to the splined cam connecting shaft 14 with a pair of retaining plates 22 which are seated into a groove 24 behind the first or second splined end (16 or 18) of the splined cam connecting shaft 14. The splined coupler 20 is then connected to an end 26 of the cam section 12 via a plurality of bolts 28 which pass through the retaining plates 22 into a cam section coupler 30 (coupling end) which comprises the end 26 of the cam section 12. The splines of the splined coupler 20 fit onto the first or second splined ends 16 or 18 of the splined cam connecting shaft 14 with sufficient clearance such that there is "play" (movement) between the splined coupler 20 and the splined cam connecting shaft 14. The splined coupler 20 is therefore not rigidly connected to or integral to the splined cam connecting shaft 14. Because of the "play" present in the splined coupler 20 between the cam sections 12, wear and erosion which occur during long term operation of the engine, the "play" of the system can increase to a magnitude which decreases the efficiency of the engine and decreases the stability and strength of the camshaft 10 as a whole as noted above. This often necessitates repeated replacement or repair of the splined cam connecting shafts 14, and may even cause replacement of the splined couplers 20 which are attached to and which mate with the first and second splined ends 16 and 18 of the splined cam connecting shaft 14. Additionally, the grooves 24 for the two retaining plates 22 near the first and second splined ends 16 and 20 of the cam connecting shaft 14 introduce weakness in the cam connecting shaft 14.

While the camshaft 10 which uses the splined couplers 20 has certain disadvantages as noted above, it advantageously enables the splined cam connecting shaft 14 to be engineered in a single standard configuration. Splined couplers 20 which are designed to fit to cam sections 12 which do have different coupling configurations can be fitted to one type of the splined cam connecting shaft 14. For example, the INGERSOLL-RAND KVR and KVT series has cam sections 12 having splined couplers 20 referred to as "A," "B," "C," and "D." Each designation represents a different cam alignment. The alignment of the cam section coupler 30 (coupling end) on an end 26 of cam section 12 is matched with the alignment of the splined coupler 20 by an alignment pin 32 on the splined coupler 20 which fits into an alignment hole 34 on the coupling end 30. Thus, splined couplings 20 having different orientations of the alignment pin 32 can be attached to the same standard splined cam connecting shaft 14 to construct different camshafts 10.

Figure 4:
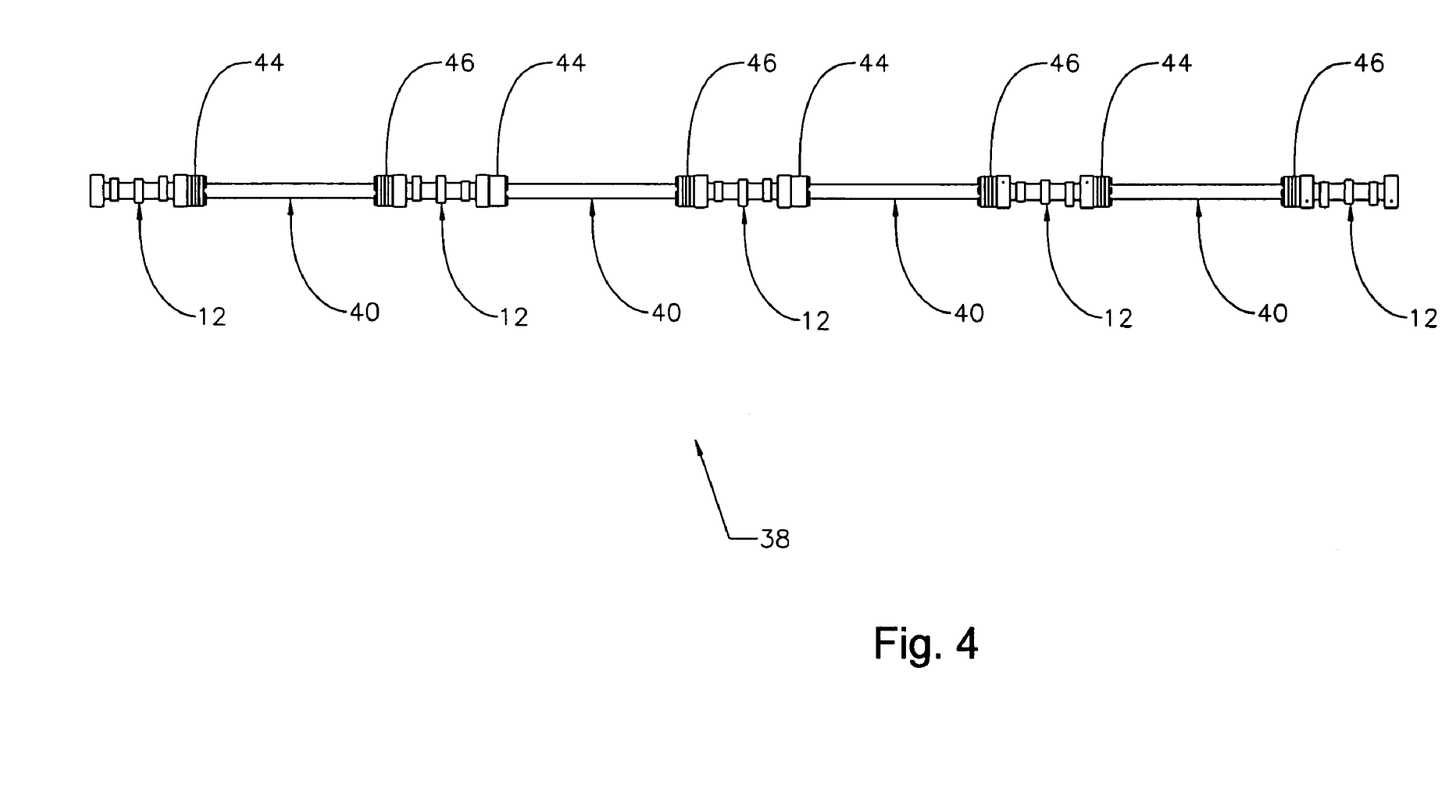
FIG. 4 shows an elevational view of a camshaft constructed using the cam connecting shaft of the present invention.
Figure 5:
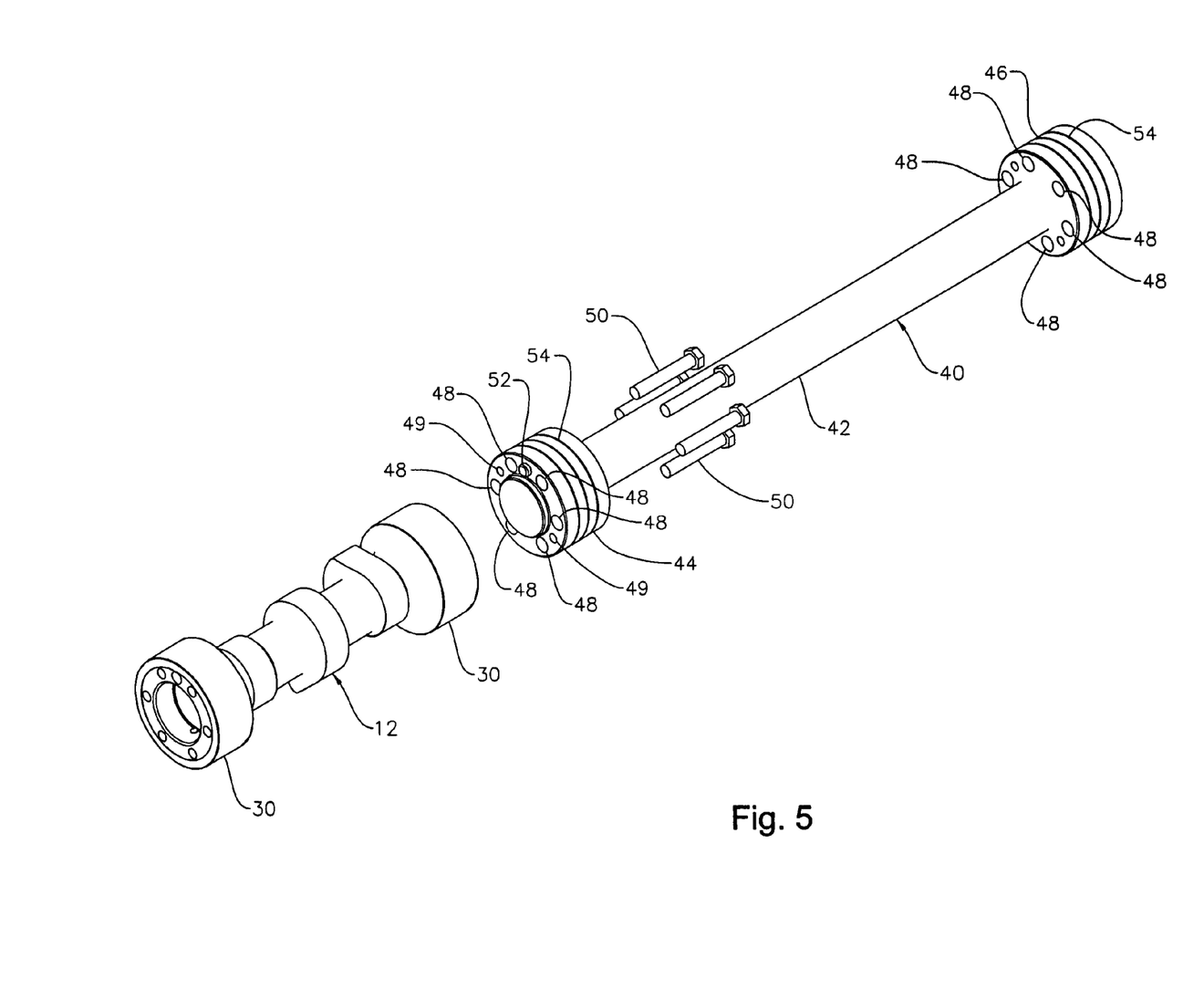
FIG. 5 shows a perspective view of a disassembled cam section and cam connecting shaft of the present invention.
Figure 6:
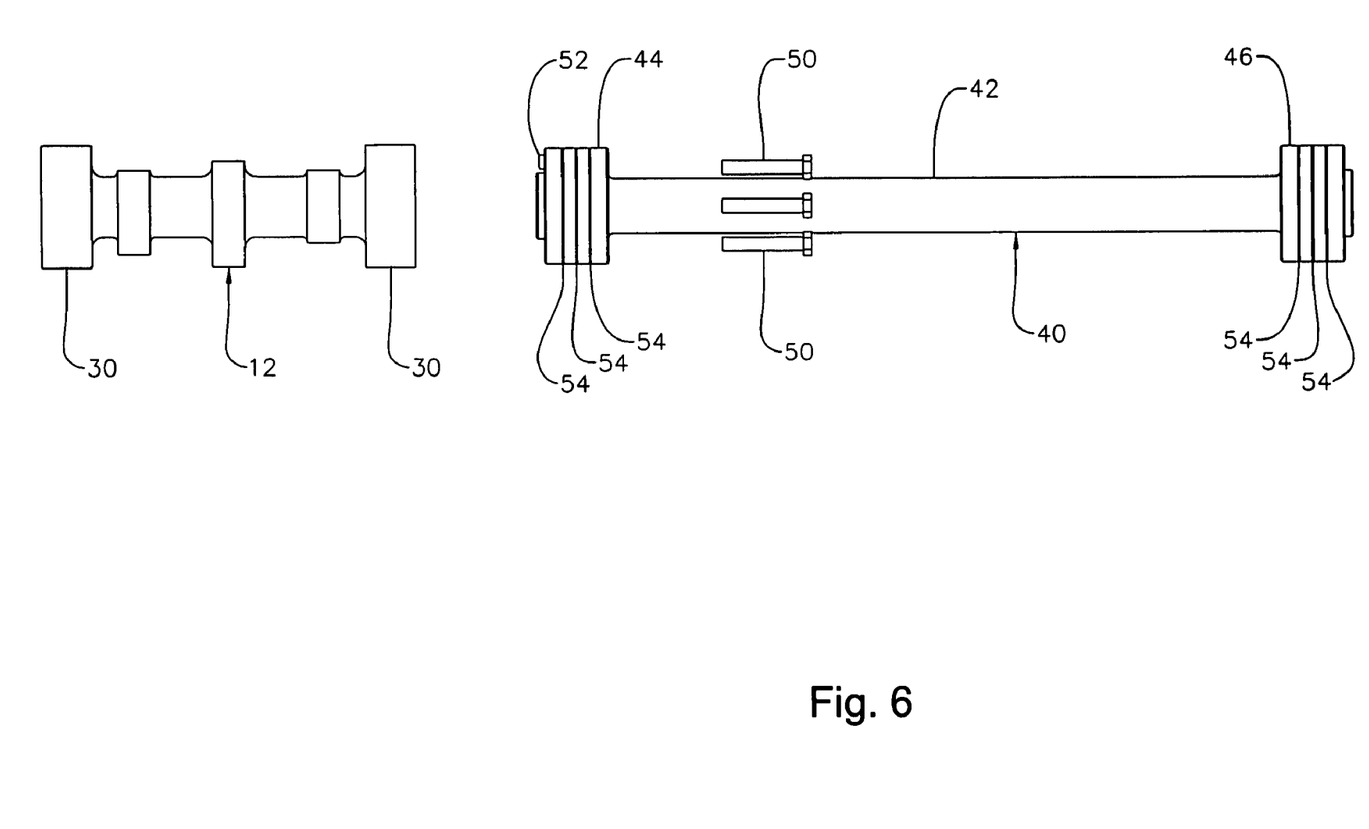
FIG. 6 shows an elevational view of the disassembled cam section and cam connecting shaft of FIG. 5.
Figure 7A:
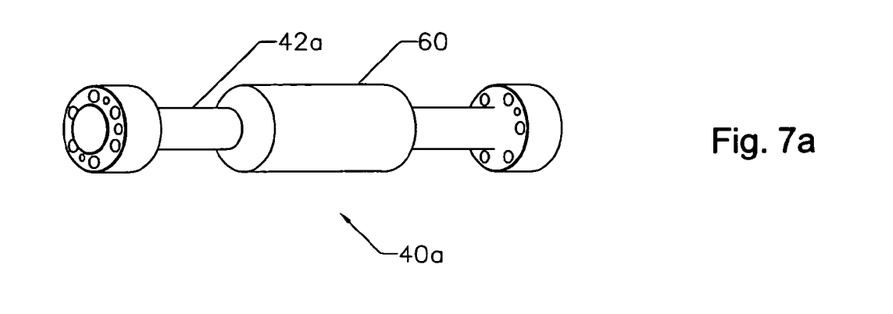
FIG. 7A shows a perspective view of an alternate embodiment of the cam connecting shaft of the present invention.
Figure 7B:
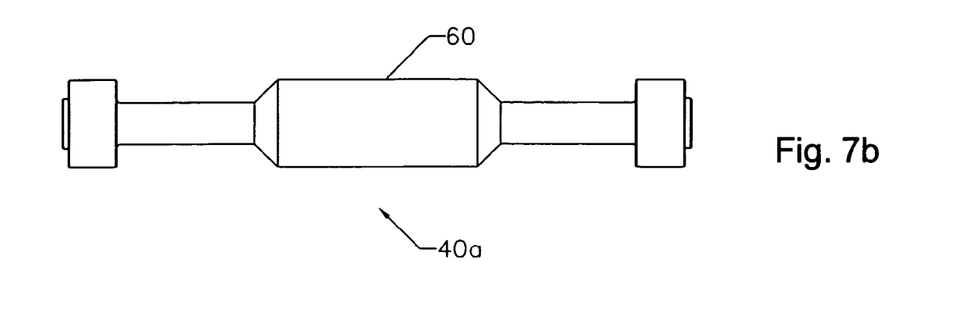
FIG. 7B shows an elevational view of the embodiment of FIG. 7A.

The present invention, to the contrary, comprises a camshaft 38 having zero degree backlash constructed from one or more non-splined cam connecting shafts 40 as shown in FIGS. 4-6. The non-splined cam connecting shaft 40 comprises a shaft 42, and a first end coupler 44 and a second end coupler 46 which are at opposite ends of the shaft 42. The first end coupler 44 and second end coupler 46 are either integral to the shaft 42, or are rigidly and non-movably secured to the shaft 42. Further explanation of how the first end coupler 44 and second end coupler 46 may be non-movably secured to the shaft 42 is provided below.

Each first end coupler 44 and second end coupler 46 has a plurality of bolt holes 48 through which bolts 50 are inserted for connecting the first end coupler 44 or the second end coupler 46 to a corresponding coupling end 30. Each first end coupler 44 or second end coupler 46 may have a jackscrew hole 49 having a jackscrew (not shown) therein. Each first end coupler 44 and second end coupler 46 of the non-splined cam connecting shaft 40 has an alignment hole (not shown) from which an alignment pin 52 protrudes for insertion into a corresponding alignment hole (not shown) on the cam section coupler 30. The first end coupler 44 and second end coupler 46 each has a specific alignment pin 52 orientation for mating with a variety of cam sections 12 in a variety of configurations according to the positions of the alignment holes in the coupling 30 as is appropriate for the various INGERSOLL-RAND KVR and KVT gas engines (as discussed in more detail below).

In a preferred embodiment, the non-splined cam connecting shaft 40 is constructed from "4340" steel bars (which is well known to those of ordinary skill in the art) which are turned to form integral couplers at each end (first end coupler 44 and second end coupler 46) of the steel bar which are then further manufactured in accordance with the description provided herein. The non-splined cam connecting shaft 40 may be constructed of any other type of steel or metal alloy which allows it to be constructed and used as described and claimed herein.

Each first end coupler 44 and second end coupler 46 may optionally be equipped with one or more identification grooves 54 which identify the particular position of the alignment pin 52 on the first end coupler 44 or second end coupler 46. As shown in FIGS. 5 and 6, the non-splined cam connected shaft 40 is preferably connected to the cam section 12 via the bolts 50 which are inserted through the bolt holes 48 in the first end coupler 44 or second end coupler 46 and are secured into corresponding holes in the coupling end 30 thereby providing camshaft 38. The non-splined cam connecting shaft 40 of the present invention is connected to the cam section 12 without retaining plates and therefore does not require a groove such as groove 24 of the prior art splined cam connecting shaft 14. Absence of such a groove 24 results in increased strength and durability of the non-splined cam connecting shaft 40. Rigidity of the first end coupler 44 and second end coupler 46 on the non-splined cam connecting shaft 40 provides durability and extended wear due to the lack of play (zero degree backlash) in the camshaft 38 during engine operation.

FIGS. 7A-12B show a variety of different embodiments of the manner of construction of the non-splined cam connecting shaft of the present invention. In the embodiment designated in FIGS. 7A and 7B as general reference numeral 40a, a central portion of a steel bar 42a used to construct the cam connecting shaft 40a is left unturned thereby leaving a large central mass 60 therein.

Figure 8A:
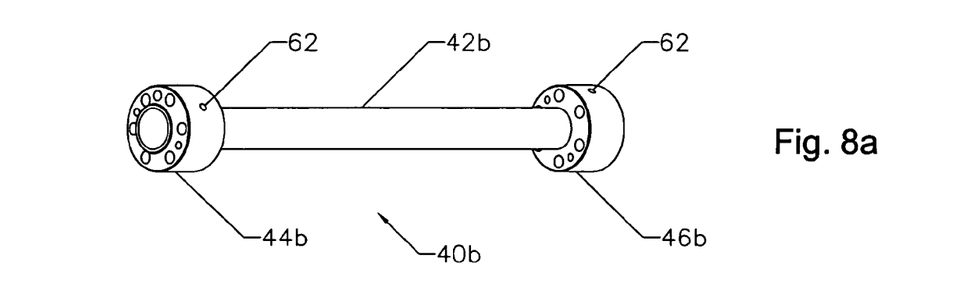
FIG. 8A shows a perspective view of an alternate embodiment of the cam connecting shaft of the present invention.
Figure 8B:
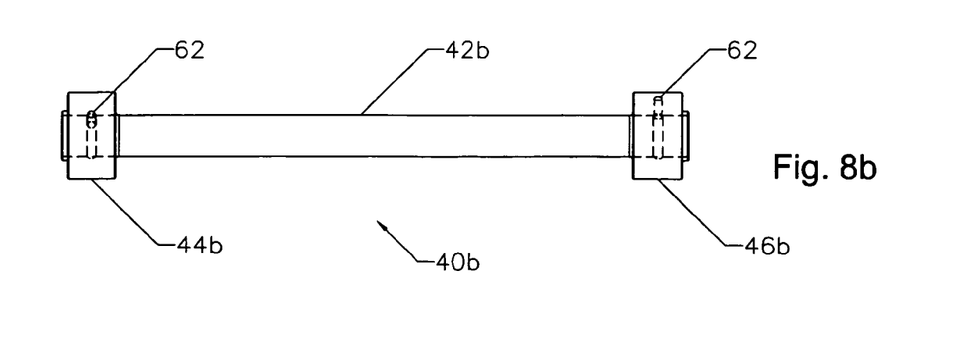
FIG. 8B shows an elevational view of the embodiment of FIG. 8A.

Another embodiment of the non-splined cam connecting shaft is designated in FIGS. 8A and 8B, as general reference numeral 40b. A first end coupler 44b and a second end coupler 46b of the non-splined cam connecting shaft 40b are rigidly mounted on and connected to a bar 42b via a hydraulic mechanism 62 in a manner known to those of ordinary skill in the art.

Figure 9A:
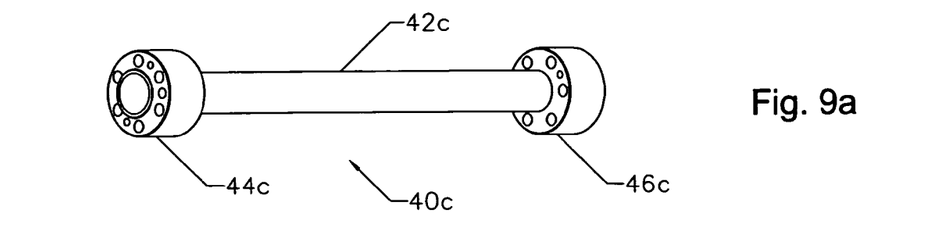
FIG. 9A shows a perspective view of an alternate embodiment of the cam connecting shaft of the present invention.
Figure 9B:
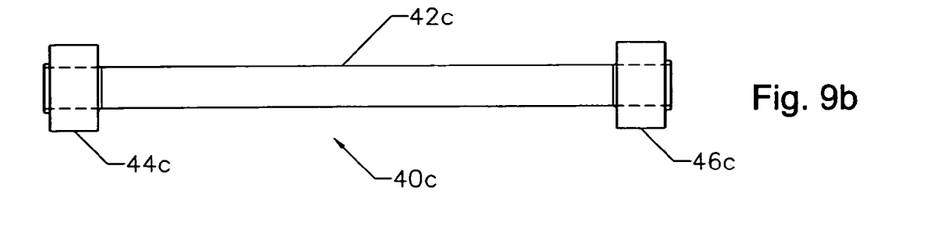
FIG. 9B shows an elevational view of the embodiment of FIG. 9A.

Another embodiment of the non-splined cam connecting shaft is designated in FIGS. 9A and 9B as general reference numeral 40c. A first end coupler 44c and a second end coupler 46c of the non-splined cam connecting shaft 40c are shrink fitted onto a bar 42c thereby rigidly mounting and connecting the couplers 44c and 46c to the bar 42c.

Figure 10A:
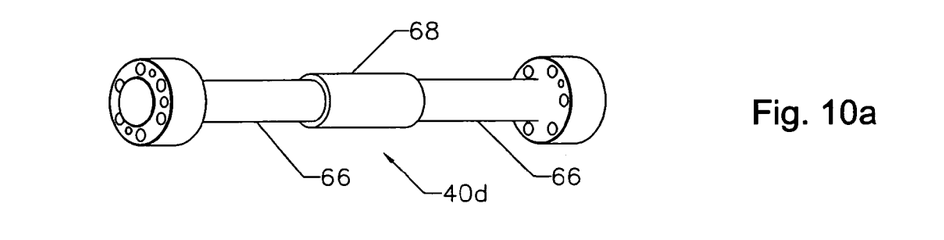
FIG. 10A shows a perspective view of an alternate embodiment of the cam connecting shaft of the present invention.
Figure 10B:
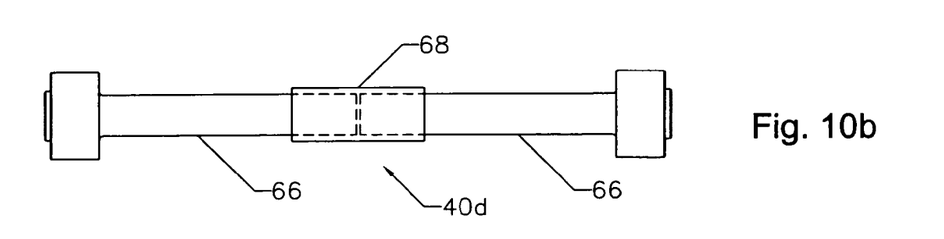
FIG. 10B shows an elevational view of the embodiment of FIG. 10A.
Figure 10C:
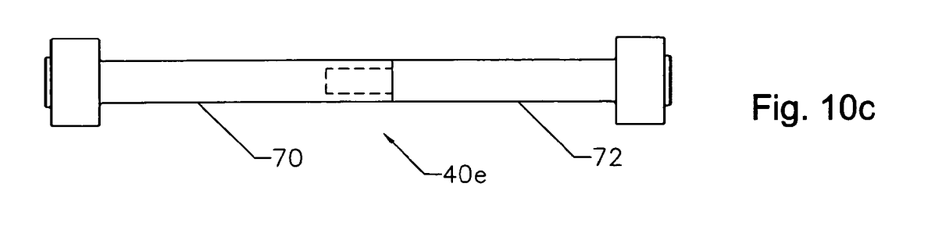
FIG. 10C shows an elevational view of an alternate embodiment of the cam connecting shaft of the present invention.

Another embodiment of the non-splined cam connecting shaft of the present invention is designated in FIGS. 10A and 10B as the general reference numeral 40d. The non-splined cam connecting shaft 40d is constructed from two separate "half-shafts" 66 which are connected together via a shrink-fit sleeve 68 in a manner well known in the art. In another embodiment shown in FIG. 10c, a non-splined cam connecting shaft 40e is constructed from two separate half-shafts 70 and 72 wherein half-shaft 70 has a female configuration for receiving the half-shaft 72 which has a male configuration. The half-shafts 70 and 72 are then shrink-fitted or otherwise connected together in a manner known to those of ordinary skill in the art.

Figure 11A:
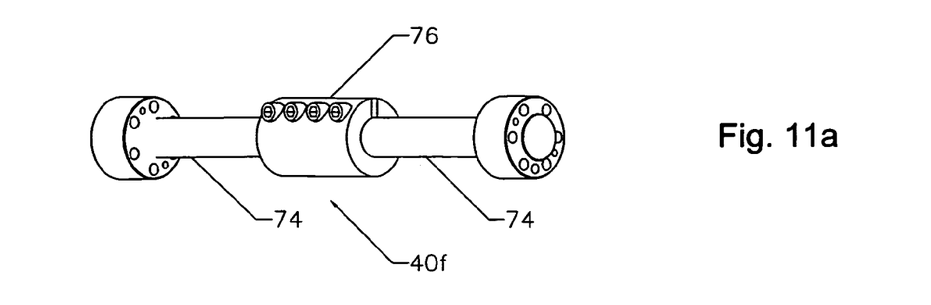
FIG. 11A shows a perspective view of an alternate embodiment of the cam connecting shaft of the present invention.
Figure 11B:
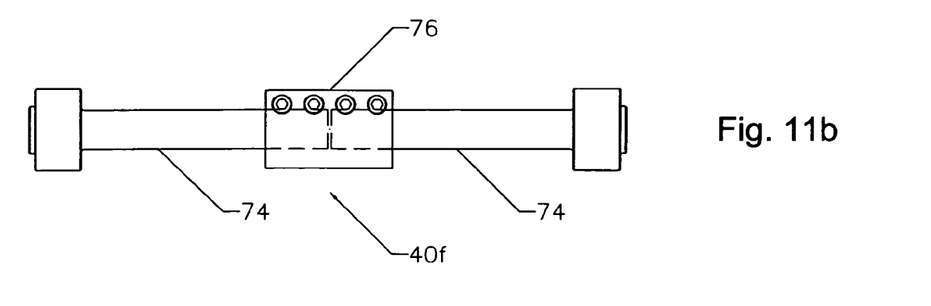
FIG. 11B shows an elevational view of the embodiment of FIG. 11A.

Another embodiment of the non-splined cam connecting shaft of the present invention is designated in FIGS. 11A and 11B as general reference numeral 40f. The non-splined cam connecting shaft 40f is constructed from two separate half-shafts 74 which are connected together via a clamp sleeve 76 in a manner well known to those of ordinary skill in the art.

Figure 12A:
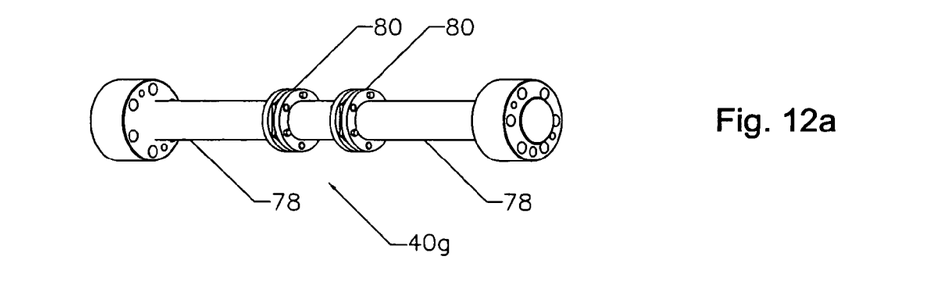
FIG. 12A shows a perspective view of an alternate embodiment of the cam connecting shaft of the present invention.
Figure 12B:
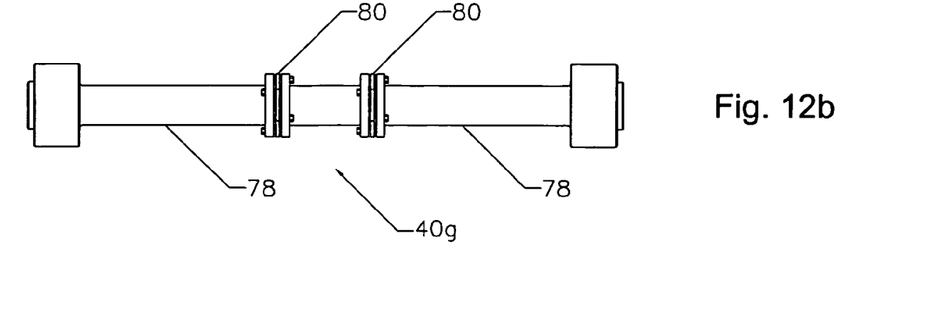
FIG. 12B shows an elevational view of the embodiment of FIG. 12A.

Another embodiment of the non-splined cam connecting shaft of the present invention is designated in FIGS. 12A and 12B as general reference numeral 40g. The non-splined cam connecting shaft 40g is constructed from two separate half-shafts 78 via a flexible disk coupling 80 in a manner well known to those of ordinary skill in the art.

Figure 13A:
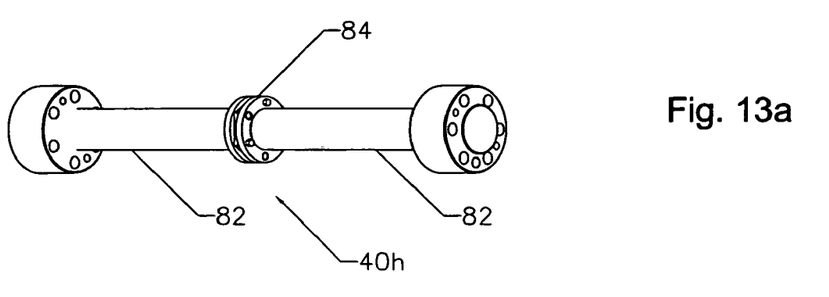
FIG. 13A shows a perspective view of an alternate embodiment of the cam connecting shaft of the present invention.
Figure 13B:
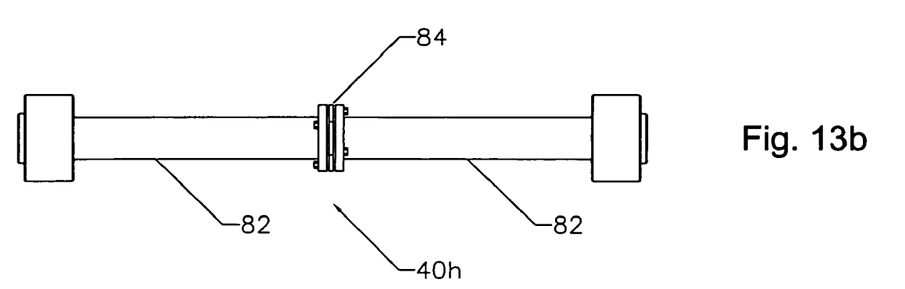
FIG. 13B shows an elevational view of the embodiment of FIG. 13A.

Another embodiment of the non-splined cam connecting shaft of the present invention is designated in FIGS. 13A and 13B as general reference numeral 40h. The non-splined cam connecting shaft 40h is constructed from two separate half-shafts 82 via a flexible disk coupling 84 in a manner well known to those of ordinary skill in the art.

Flexible disk couplings such as flexible disk couplings 80 and 84 are well known to those of ordinary skill in the art and are available through a number of commercial sources. Commercial sources of flexible disk couplings include EMERSON ELECTRIC CO. (The KD series of disc couplings from EMERSON INDUSTRIAL AUTOMATION) and ABSSAC, which produces metal disc couplings. Examples of flexible disk couplings are shown in U.S. Pat. Nos. 6,193,611; 5,697,848; 4,133,187; 4,092,836; 4,107,950; 4,079,598; and 6,037,687, each of which is hereby expressly incorporated by reference herein in its entirety.

As noted previously, each non-splined cam connecting shaft 40 is configured to be used to construct a camshaft 38 for use in a particular engine type. Each engine type in the INGERSOLL RAND KVR-KVT series has cam sections 12 having coupling ends 30 which enable the construction of camshafts 38 having a variety of combinations of cam sections 12. The non-splined cam connecting shaft 40 of the present invention is preferably designed such that the first end coupler 44 is on a left-hand end and the second end coupler 46 is on a right-hand end of the shaft 42. The first end coupler 44 (on the left-hand) is constructed such that the alignment pin 52 is at the "12-o'clock" position. The second end coupler 46 (on the right-hand) is constructed such that the alignment pin 52 is located a predetermined number of degrees clockwise (CW) or counter clockwise (CCW) away from the alignment pin 52 in the first end coupler 44 when viewed in a direction from the first end coupler 44 toward the second end coupler 46. For example, for the A-A cam section combination of the 38-2 and 616-4 KVR and KVT engine types, the position of the alignment pin 52 in second end coupler 46 is 90° clockwise (CW) from the alignment pin 52 of the first end coupler 44, when viewed form the first end coupler 44 along the bar 42 toward the second end coupler 46. Similarly, for the A-A cam section combination of the 38-1 KVR and KVT engine type, for example, the alignment pin 52 of the second end coupler 46 is 45° counterclockwise (CCW) of the alignment pin 52 of the first end coupler 44. Other preferred configurations are shown in Table I.

TABLE I

POSITIONS OF ALIGNMENT PINS ON
COUPLERS OF CAM CONNECTING SHAFTS

| Ingersoll-Rand KVR/KVT Coupling Combination | Ingersoll-Rand KVR/KVT Engine Type/Qty Required | Right hand Alignment Pin Position (degrees/direction) in Cam Connecting Shaft |
|---|---|---|
| A-A | KVR 616/2 | 45°/CW |
| A-A | KVT 38/4, KVR 38/2, KVR 616/4, KVT 616/4 | 90°/CW |
| A-A | KVT 38/2, KVR 616/2 | 45°/CCW |
| A-A | KVR 38/2, KVR 616/4, KVT 616/4 | 90°/CCW |
| A-A | KVR 38/2, KVT 616/2 | 135°/CW |
| A-A | KVT 616/2 | 135°/CCW |
| A-A | KVR/KVT 512/2 | 180° |
| A-D | KVR/KVT 410/4 | 144°/CCW |
| D-D | KVR/KVT 410/4 | 72°/CW |
| A-B | KVR/KVT 512/4 | 120°/CCW |
| A-C | KVR/KVT 512/4 | 120°/CW |

It is to be understood any of the non-splined cam connecting shafts 40-40g or other embodiments described or contemplated herein can be constructed using any of the alignment pin configurations described in Table I. Also, specific dimensions and hole positions shown in the drawings herein (for example positions of bolt hole 48 or jackscrew holes 49) are not intended to limit the invention but are only intended as examples.

The present invention further contemplates methods of using any of the non-splined cam connecting shafts 40-40g or other embodiments described or contemplated herein in combination with a cam section 12 in an engine, and a method of using a plurality of different configurations of the non-splined cam connecting shafts 40-40g of the present invention which connect a series of corresponding cam sections 12 for use in an engine, particularly in an INGERSOLL RAND KVR or KVT engine.

The present invention is not to be limited in scope by the specific embodiments described herein, since such embodiments are intended as but single illustrations of one aspect of the invention and any functionally equivalent embodiments are within the scope of this invention. Indeed, various modifications of the methods of the invention in addition to those shown and described herein will become apparent to those skilled in the art from the foregoing description.

What is claimed is:

1. A non-splined cam connecting shaft for forming a non-splined camshaft, comprising:
    a metal bar having a first end which is non-splined and a second end which is non-splined;
    a first end coupler integral to or rigidly mounted on the first end of the metal bar and adapted to be boltingly connected to a coupling end of a first cam section by a first plurality of bolts inserted into a first plurality of holes in the coupling end of the first cam section; and
    a second end coupler integral to or rigidly mounted on the second end of the metal bar and adapted to be boltingly connected to a coupling end of a second cam section by a second plurality of bolts inserted into a second plurality of holes in the coupling end of the second cam section;
    wherein the first end coupler has a first alignment hole adapted to receive a first alignment means which is adapted to fit into a corresponding first alignment hole in the coupling end of the first cam section, and wherein the second end coupler has a second alignment hole adapted to receive a second alignment means which is adapted to fit into a corresponding second alignment hole in the coupling end of the second cam section, and wherein the second alignment means, when in the second alignment hole of the second end coupler, has a position relative to the first alignment means in the first alignment hole of the first end coupler selected from the group consisting of 45° clockwise, 90° clockwise, 45° counterclockwise, 90° counterclockwise, 135° clockwise, 135° counterclockwise, 180°, 144° counterclockwise, 72° clockwise, 120° clockwise, and 120° counterclockwise; and
    wherein when the non-splined cam connecting shaft is connected to the coupling end of the first cam section and to the coupling end of the second cam section, a non-splined camshaft is formed, said non-splined camshaft having zero degree backlash.

2. The non-splined cam connecting shaft of claim 1 further comprising a jackscrew hole.

3. The non-splined cam connecting shaft of claim 1 further comprising identification means in the first end coupler and the second end coupler.

4. The non-splined cam connecting shaft of claim 1 absent a groove behind each first end coupler and second end coupler for receiving a retaining plate.

5. The non-splined cam connecting shaft of claim 1 wherein the metal bar has a central mass in a medial portion of the metal shaft between the first end coupler and the second end coupler.

6. The non-splined cam connecting shaft of claim 1 wherein the first end coupler and second end coupler are rigidly mounted on the metal bar by a hydraulic mechanism or are shrunk-fit upon the metal bar.

7. The non-splined cam connecting shaft of claim 1 formed by connecting together a pair of half-shafts by a shrink-fit sleeve, a clamp sleeve, or a flexible disk coupling.

8. A camshaft assembly, comprising:
    a first cam section having a coupling end;
    a second cam section having a coupling end;
    a non-splined cam connecting shaft comprising:
        a metal bar having a first end which is non-splined and a second end which is non-splined;
        a first end coupler integral to or rigidly mounted on the first end of the metal bar and adapted to be boltingly connected to the coupling end of the first cam section by a first plurality of bolts inserted into a first plurality of holes in the first end coupler; and
        a second end coupler integral to or rigidly mounted on the second end of the metal bar and adapted to be boltingly connected to the coupling end of the second cam section by a second plurality of bolts inserted into a second plurality of holes in the second end coupler; and
    wherein the first end coupler of the non-splined cam connecting shaft is connectable to the coupling end of the first cam section and the second end coupler of the non-splined cam connecting shaft is connectable to the coupling end of the second cam section, and wherein when the non-splined cam connecting shaft is connected to the coupling end of the first cam section and to the coupling end of the second cam section, a non-splined camshaft is formed, said non-splined camshaft having zero degree backlash; and
    wherein the first end coupler is adapted to receive a first alignment means which is adapted to be received by the coupling end of the first cam section, and wherein the second end coupler is adapted to receive a second alignment means which is adapted to be received by the coupling end of the second cam section, and wherein the second cam section can be aligned relative to the first cam section in a position selected from the group consisting of 45° clockwise, 90° clockwise, 45° counterclockwise, 90° counterclockwise, 135° clockwise, 135° counterclockwise, 180°, 144° counterclockwise, 72° clockwise, 120° clockwise, and 120° counterclockwise.

9. The camshaft of claim 8 wherein the non-splined cam connecting shaft is absent a groove behind each first end coupler and second end coupler for receiving a retaining plate.

10. The camshaft of claim 9 wherein the non-splined cam connecting shaft has a central mass in a medial portion of the metal shaft between the first end coupler and the second end coupler.

11. The camshaft of claim 8 wherein the first end coupler and the second end coupler of the non-splined cam connecting shaft are rigidly mounted on the metal bar by a hydraulic mechanism or are shrunk-fit upon the metal bar.

12. The camshaft of claim 8 wherein the non-splined cam connecting shaft is formed by connecting together a pair of half-shafts by a shrink-fit sleeve, a clamp sleeve, or a flexible disk coupling.

* * * * *